United States Patent [19]
Stephenson

[11] Patent Number: 5,828,917
[45] Date of Patent: Oct. 27, 1998

[54] CAMERA WITH BUILT-IN SUPPORT

[75] Inventor: Stanley W. Stephenson, Spencerport, N.Y.

[73] Assignee: Eastman Kodak Company, Rochester, N.Y.

[21] Appl. No.: 922,737

[22] Filed: Sep. 3, 1997

[51] Int. Cl.⁶ .................................................. G03B 17/00
[52] U.S. Cl. .......................................................... 396/424
[58] Field of Search .................................... 396/419, 420, 396/423, 424, 433

[56] References Cited

U.S. PATENT DOCUMENTS

| | | |
|---|---|---|
| 1,656,852 | 1/1928 | Aspis ........................................ 396/423 |
| 2,187,449 | 1/1940 | French ...................................... 396/433 |
| 3,690,235 | 9/1972 | Ainslie et al. . |
| 3,956,759 | 5/1976 | Karikawa . |
| 3,966,101 | 6/1976 | Taylor, III . |
| 4,114,171 | 9/1978 | Altman . |
| 4,341,449 | 7/1982 | Iwata et al. . |
| 4,509,667 | 4/1985 | Meldrum ................................... 224/250 |
| 4,692,807 | 9/1987 | Kee . |
| 5,064,109 | 11/1991 | Caster . |
| 5,177,517 | 1/1993 | Schappler et al. . |
| 5,323,195 | 6/1994 | Phillips . |
| 5,495,307 | 2/1996 | Koiwai et al. . |

Primary Examiner—David M. Gray
Attorney, Agent, or Firm—Roger A. Fields

[57] ABSTRACT

A camera comprising a housing a having a top and a bottom, and a support for one's forearm and/or wrist, is characterized in that the bottom of the housing is concave to define a rounded inward hollow at a location directly beneath the top of the housing for receiving one's forearm and/or wrist along the bottom of the housing, whereby the support is built into the housing.

2 Claims, 5 Drawing Sheets

CAMERA WITH BUILT-IN SUPPORT

FIELD OF THE INVENTION

The invention relates generally to the field of photography, and in particular to cameras. More specifically, the invention relates to a camera with a built-in support for one's forearm and/or wrist.

BACKGROUND OF THE INVENTION

No matter how good a camera may be, or how accurately it has been made, it cannot yield really acceptable results if it moves during exposure. Much of the poor definition obtained by photographers is caused by a slight movement of the camera during the time the shutter is open.

Rather than using a tripod as a support for holding the camera steady, various supports for one's forearm and/or wrist can be attached to the camera. For example, see prior art U.S. Pat. Nos. 5,323,195 issued Jun. 21, 1994, 5,064,109 issued Nov. 12, 1991, and 4,692,807 issued Sep. 8, 1987.

SUMMARY OF THE INVENTION

A camera comprising a housing a having a top and a bottom, and a support for one's forearm and/or wrist, is characterized in that:

the bottom of the housing is concave to define a rounded inward hollow at a location directly beneath the top of the housing for receiving one's forearm and/or wrist along the bottom of the housing, whereby the support is built into the housing.

DETAILED DESCRIPTION OF THE INVENTION

Figure 1:
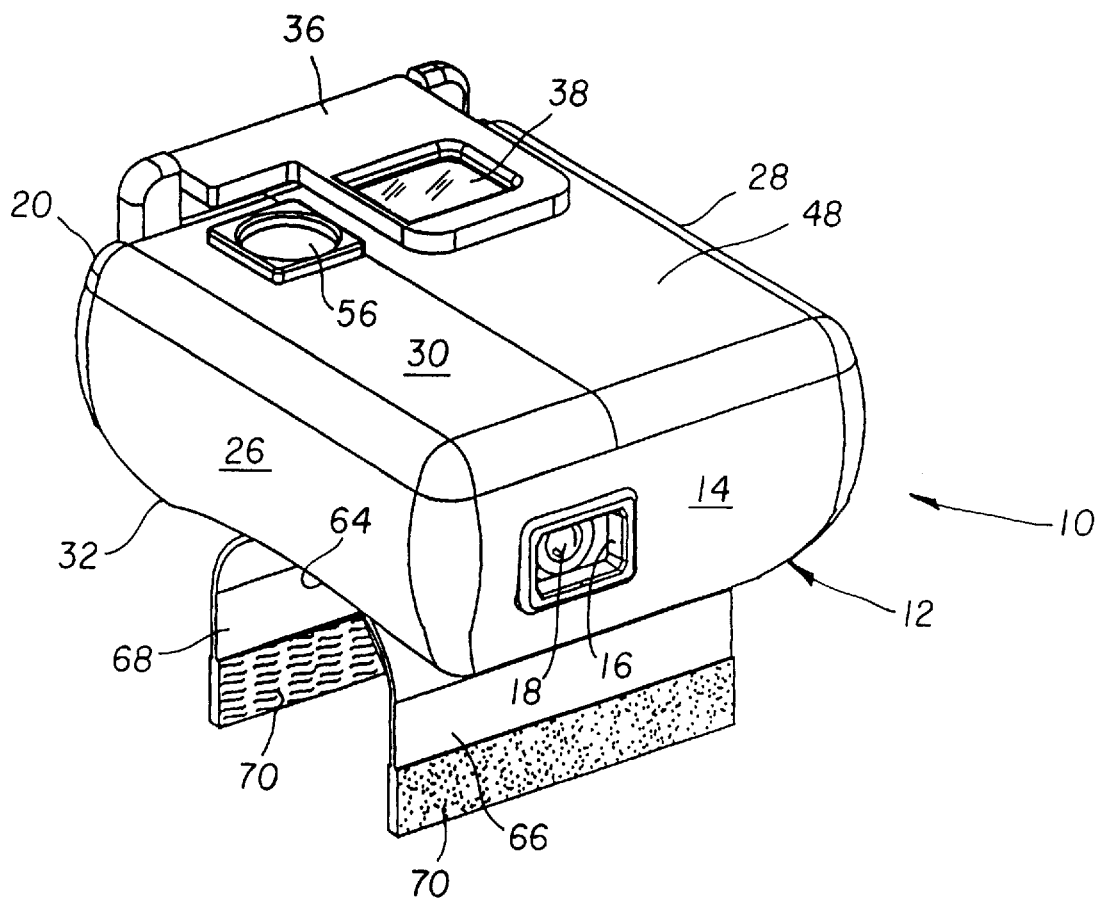
FIG. 1 is a front, top perspective view of a camera according to a preferred embodiment of the invention.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a camera 10 including a rectangular-shaped housing 12 which has a front 14 provided with an opening 16 for a taking lens 18, a rear 20 provided with an opening 22 for an eye lens 24, a pair of sides 26 and 28, a top 30 and a bottom 32. The top 30 and the bottom 32 each have substantially greater surface areas than the front, 14, the rear 20 and the sides 26 and 28. The eye lens 24 and the taking lens 18 have a common through-the-lens viewing axis 34, to view the subject to be photographed. See FIGS. 3 and 5. Alternatively, an optional flip-up viewfinder 36 pivotally connected to the rear 20 can be flipped up to view the subject through a framing window 38 of the flip-up viewfinder. As is obvious from FIGS. 1–5, the housing 12 is the non-expandable type as contrasted with one that includes an expandable bellows.

Figure 2:
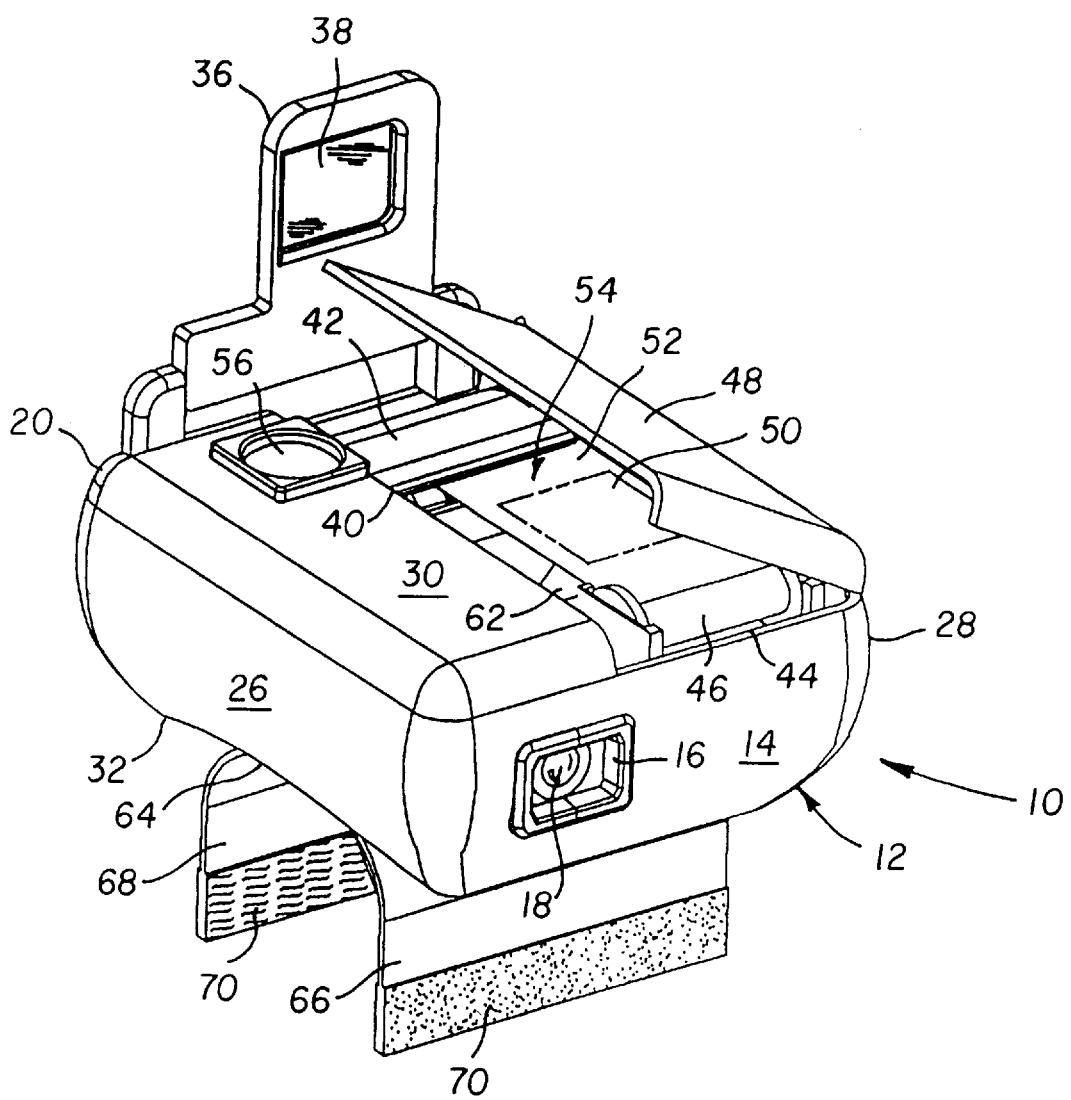
FIG. 2 is a front, top perspective view similar to FIG. 1, showing a top loading door of the camera open.
Figure 3:
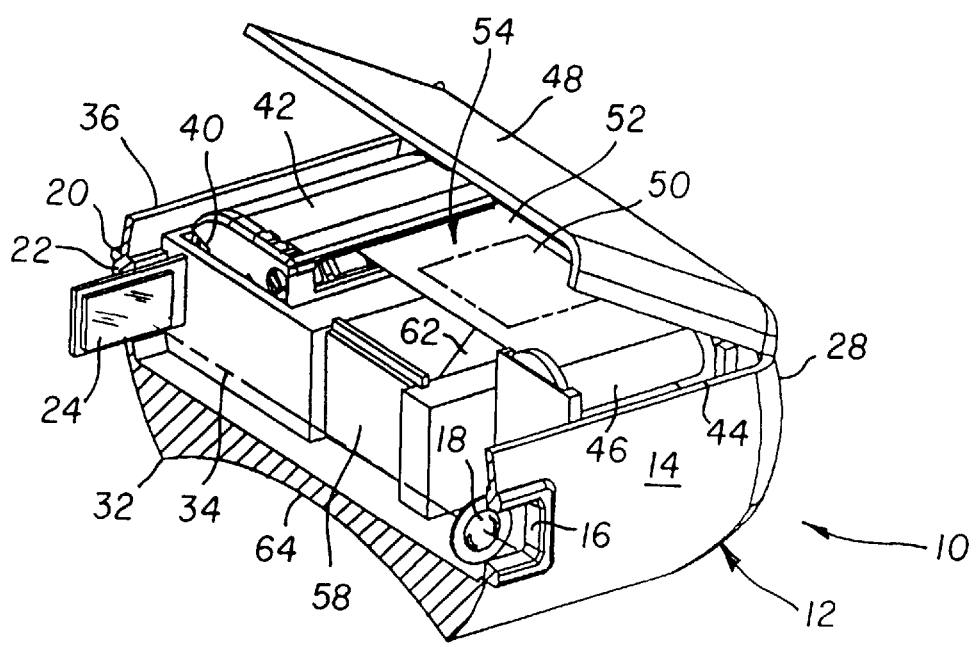
FIG. 3 is a front, top perspective view similar to FIG. 2, showing the camera partially cut away to indicate the optical viewing axis.
Figure 4:
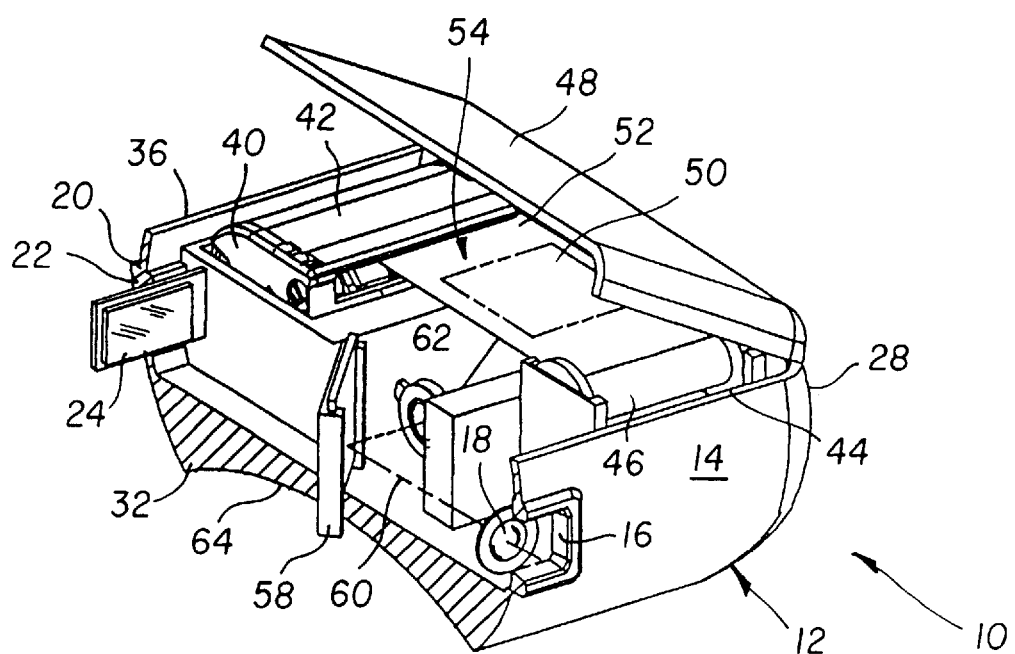
FIG. 4 is a front, top perspective view similar to FIG. 2, showing the camera partially cut away to indicate the optical picture-taking axis.

As shown in FIGS. 2–4, a cartridge receiving chamber 40 for receiving a conventional film cartridge 42 is provided within the housing 12 and a film take-up chamber 44 containing a rotatably supported spool 46 is provided within the housing. The top 30 of the housing 12 includes a door 48 that can be opened to access the cartridge receiving chamber 40 and the spool 46.

Figure 5:
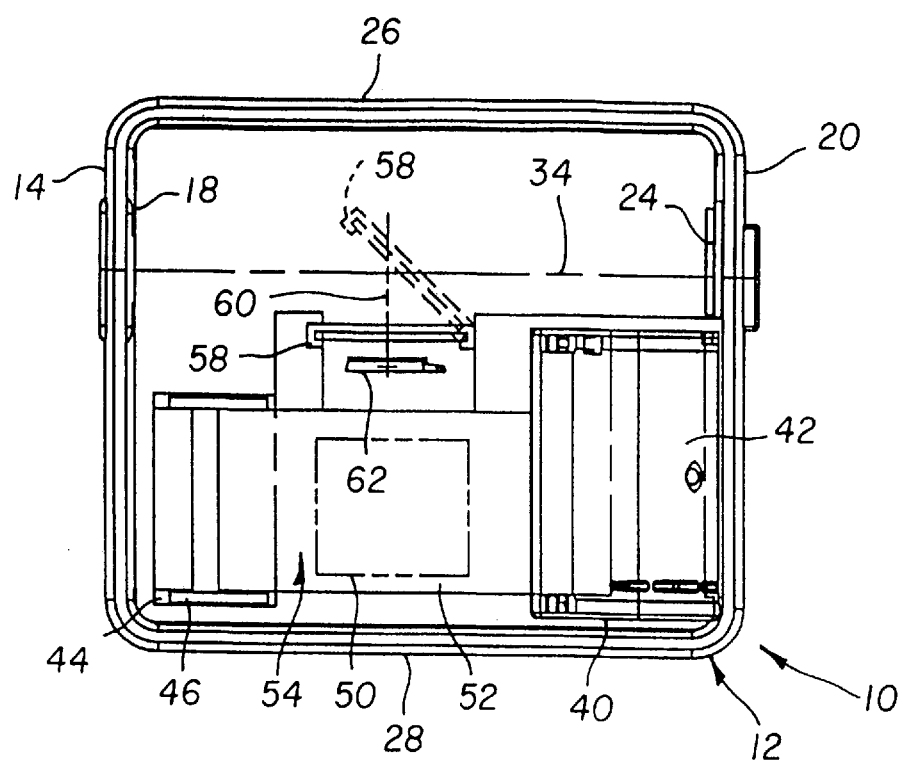
FIG. 5 is top plan view of the camera, showing its interior.

To make an exposure 50 on an unexposed section 52 of a filmstrip 54, between the film cartridge 42 and the spool 46, a shutter release button 56 on the top 30 of the housing 12 is manually depressed. As is generally known, this causes a retractable mirror 58 to momentarily change from a normal position spaced from the viewing axis 34, as shown in FIG. 3, to a reflecting position across the viewing axis, as shown in FIGS. 4 and 5. While the retractable mirror 58 is momentarily in the reflecting position, shown in FIGS. 4 and 5, ambient light reflected from the subject being photographed is transmitted along a taking axis 60, first through the taking lens 18, then reflected 90° to a fixed mirror 62, and then reflected 90° to the film section 52. This is similar to the way an exposure is made in prior art U.S. Pat. No. 5,495,307 issued Feb. 27, 1996.

As shown in FIGS. 1–4, the bottom 32 of the housing 12 is concave to define a rounded inward hollow 64 at a location directly beneath the top 30 of the housing for receiving one's forearm and/or wrist along the bottom of the housing. The hollow 64 longitudinally extends completely across the bottom 32 of the housing 12 from the side 26 to the side 28 of the housing, and is rounded from the front 14 to the rear 20 of the housing. A pair of straps 66 and 68 hang down from the bottom 32 of the housing 12 and can be folded over the hollow to secure one's forearm and/or wrist in the hollow. The straps 66 and 68 have known fastening means 70 for securing them together about the forearm and/or wrist.

The invention has been described with reference to a preferred embodiment. However, it will be appreciated that variations and modifications can be effected by a person of ordinary skill in the art without departing from the scope of the invention.

PARTS LIST 10. camera
12. housing
14. front
16. opening
18. taking lens
20. rear
22. opening
24. eye lens
26. side
28. side
30. top
32. bottom
34. through-the-lens viewing axis
36. flip-up viewfinder
38. framing window
40. cartridge receiving chamber
42. film cartridge
44. film take-up chamber
46. spool
48. door 50. exposure
52. unexposed film section
54. filmstrip
56. shutter release button
58. retractable mirror
60. taking axis
62. fixed mirror
64. hollow
66. strap
68. strap
70. fastening means

What is claimed is:

1. A camera comprising a non-expandable housing having an opposite top and bottom and an opposite front and rear between said top and bottom, and a support for one's forearm and/or wrist, is characterized in that: said bottom of the housing is concave to define a rounded inward hollow at a location directly beneath said top of the housing for receiving one's forearm and/or wrist along the bottom of the housing to serve as said support, said front of the housing has an opening for a taking lens, and said top and bottom of the housing each have greater surfaces areas than said front and rear of the housing.

2. A camera as recited in claim 1, wherein said housing has a cartridge receiving chamber and a film take-up chamber, and said top of the housing includes a door that can be opened to access said cartridge receiving chamber and said film take-up chamber.

* * * * *